May 27, 1941.   D. H. CLEWELL   2,243,747
GRAVITY METER
Filed Feb. 21, 1940
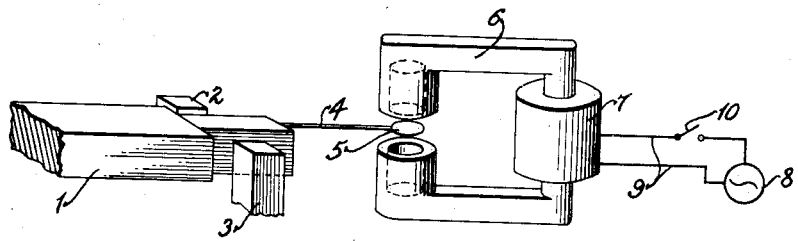
Inventor
Dayton H. Clewell
By
Dallas R. Lamont
Attorney Patented May 27, 1941

2,243,747

UNITED STATES PATENT OFFICE 2,243,747

GRAVITY METER

Dayton H. Clewell, Dallas, Tex., assignor, by mesne assignments, to Socony-Vacuum Oil Company, Incorporated, New York, N. Y., a corporation of New York Application February 21, 1940, Serial No. 320,053

4 Claims. (Cl. 265—1.4)

This invention relates to an improvement in gravity meters and more particularly to an improvement in that type of gravity meters in which a mass is resiliently supported during the making of measurements and is clamped rigidly in position at other times so that the shock incident to moving it about will not injure it or change its calibration. In particular, the present invention is directed to providing in such a gravity meter a means to prevent or stop the oscillations that would normally be occasioned by the release of the clamping means or by outside disturbances.

It is well known that gravity meters are extremely sensitive instruments which must be protected against shocks or disturbances of any kind, but it is nevertheless necessary to move these instruments from place to place if they are to be used in geophysical exploration, in order that measurements be made at these places. In order to do this without injuring the delicate mechanism or destroying the calibration of the instrument it has been common to provide the instrument with clamps that clamp the mass in position during transportation and until the time comes to make a measurement. At that time the clamps are released and the mass allowed to come to rest at a position of balance indicative of the relative gravitational force being exerted at that particular location.

However, the process of coming to rest almost invariably takes a very considerable period of time and often places undesirable strains on the instrument which stretch the supporting wires or in other ways affect its calibration. The reason for this is that it is almost impossible to release the mass from clamps without imparting to the same an impetus that starts it swinging on its resilient support, regardless of how carefully made the clamps used may be. Being in delicate balance, unless there are damping means provided, the swinging continues for a long period of time. Several types of damping means have been suggested but are generally unsatisfactory because they not only damp the oscillations of the mass but they so restrict its movement as to greatly reduce the accuracy of the measurements.

According to the present invention a new type of damping or centering means is provided which quickly and simply brings the mass to position and eliminates all tendency of the mass to oscillate and yet does this without interfering in any way with the ultimate sensitivity of the device.

The invention that accomplishes these things consists of the provision of a small disc of copper or other conductive, non-magnetic metals affixed to the mass by means of an arm which spaces it from the mass, and an electromagnet capable of producing an alternating flux of a particular pattern that tends to confine the small copper disc and make it always seek a specific location. When the copper disc is in this location the mass is automatically centered because it is fixed to the copper disc. Then, when the magnetic field is stopped, as by cutting off the current, there is no impetus whatever given to the disc nor to the mass. So that the mass will be able to reach its proper position without hindrance, the faces of the electromagnet are spaced apart sufficiently to accommodate the disc in all normal vertical displacements of the mass encountered in conducting a gravitational survey of a particular area.

In some of the newer gravity meters, arrangements are being made so that all readings are taken with the mass at a fixed or base position, the difference in gravitational force being compensated by bringing an additional force to bear on the mass to hold it in the base position. This may be done electromagnetically or electrostatically or by other means which do not form a part of this invention and will not be discussed here. However, when such is the case, the present invention has a particular application in that the mass can be immediately centered, and an amount of force applied thereto which is estimated as being sufficient to hold the same in a centered position. Thereafter, the centering mechanism may be released and an observation made as to whether or not the mass does remain in the centered position. If it does not, further adjustment in the force applied to the mass can be made and the mass again centered and another observation made upon releasing the centering mechanism. Thus accurate determinations can be made rapidly without the necessity of waiting each time until the mass comes to rest of its own volition.

A further understanding of the principles of this invention and its specific advantages may be obtained by a consideration of the accompanying drawing and the following detailed description. In this drawing only the essential parts of one preferred form of the device are shown in order to simplify the explanation. However, many modifications of the exact structure of the device may be made all within the scope of this invention as will be understood by those skilled in the art.

In the drawing, the sole figure is a prospective view of a part of a gravity meter embodying the principles of this device.

As shown in the drawing the mass 1 of a common gravity meter is adapted to be held against movement by clamping members 2 and 3 when the device is not in operation. The mass here shown is of the type commonly suspended by a bifilar suspension from a support and will rotate about its center in a horizontal plane in response to variations in gravity thus moving the mass as a whole vertically. The details of the supporting structure and the clamp operating structure are not shown for they do not form a part of this invention. However, a more detailed showing of a gravity meter of this type may be found in the United States Patent to Brown No. 2,125,282, granted August 2, 1938. The clamping members may be operated by any suitable means so that they come together and hold the mass in position at the proper time. From the mass 1 a short arm 4 supports a disc 5 of copper or some similar conductive but non-magnetic material. Positioned on opposite sides of this disc 5 are the pole faces of an electromagnet 6 which is powered by a coil 7 adapted to receive alternating current from a source 8 through leads 9 and a manually operated switch 10.

The pole faces of the electromagnet 6 are cup-shaped with the open ends of each cup facing the conductive disc 5, the inside diameters of the cups being larger than the diameter of disc 5. When the switch 10 is closed an alternating magnetic field is established all around the edge of the disc 5 and eddy currents are set up in the disc, which, in connection with the magnetic field, tend to make the disc seek a position midway between the two pole faces of the magnet and axially in line with the center of the cup-shaped pole face.

In operation, before the clamping members 2 and 3 are actuated to release the mass 1 the switch 10 may be closed. Thereafter, as the clamping members release the mass 1 the magnetic field generated by electromagnet 6 holds the disc 5 and through it the mass 1 in the exactly centered position. After the clamping members have been entirely removed from contact with the mass 1 the switch 10 may be opened and the mass allowed to swing free without any substantial tendency to oscillate having been imparted to it as a result of the mass breaking free of the clamping device.

Alternatively, the clamping members 2 and 3 may be released prior to the closing of the switch 10 in which case the oscillations start when the clamping members are released but are immediately stopped by the alternating magnetic field upon the closing of the switch. Preferably, however, the switch 10 will be closed first thus preventing the oscillation which might do some damage to the instrument or its calibration.

Although the present invention has been described as used in connection with a bifilar suspension type mass, it will be apparent that it has application to masses suspended in other ways.

I claim:

1. In a gravity meter in which a mass is resiliently suspended from a support during the measuring process, the improvement that comprises means to stop any oscillation of the mass, including a non-magnetic electro-conductive element fixed to the mass and means to create an alternating magnetic field of such a pattern around said element so that the force of reaction between the alternating magnetic field and the eddy currents in the conductive element produced by the alternating magnetic field will cause the conductive element and therefore the mass to assume a predetermined stable position relative to the pattern of said magnetic field.

2. In a gravity meter in which a mass is resiliently suspended from a support during the measuring process, the improvement that comprises means to stop any oscillation of the mass, including a non-magnetic electro-conductive disc affixed to an arm extending from the mass, and means to create an alternating magnetic field of such a pattern around said disc so that the force of reaction between the alternating magnetic field and the eddy currents in the conductive element produced by the alternating magnetic field will cause the conductive element and therefore the mass to assume a predetermined stable position relative to the pattern of said magnetic field.

3. In a gravity meter in which a mass is resiliently suspended from a support during the measuring process, the improvement that comprises means to stop any oscillation of the mass, including a non-magnetic electro-conductive disc affixed to an arm extending from the mass, and means to create an alternating magnetic field of such a pattern around said disc so that the force of reaction between the alternating magnetic field and the eddy currents in the conductive element produced by the alternating magnetic field will cause the conductive element and therefore the mass to assume a predetermined stable position relative to the pattern of said magnetic field, said last-named means including cup-shaped pole faces positioned on opposite sides of said disc, the diameter of said cups being larger than the diameter of said disc.

4. In a gravity meter in which a mass is resiliently suspended from a support during the measuring process, the improvement that comprises means to stop any oscillation of the mass, including a non-magnetic electro-conductive disc affixed to an arm extending from the mass, and means to create an alternating magnetic field of such a pattern around said disc so that the force of reaction between the alternating magnetic field and the eddy currents in the conductive element produced by the alternating magnetic field will cause the conductive element and therefore the mass to assume a predetermined stable position relative to the pattern of said magnetic field, said last-named means including cup-shaped pole faces positioned on opposite sides of said disc, the diameter of said cups being larger than the diameter of said disc, and the space between said cup members being sufficient to accommodate the disc in all normal vertical displacements of the mass encountered in conducting a gravitational survey of an area.

DAYTON H. CLEWELL.